United States Patent
Biggs

[19]

[11] Patent Number: 5,816,044
[45] Date of Patent: Oct. 6, 1998

[54] HEADER ASSEMBLY FOR INTERNAL COMBUSTION ENGINES

[76] Inventor: Gary L. Biggs, 8661 N. 64th Pl., Paradise Valley, Ariz. 85253

[21] Appl. No.: 939,018

[22] Filed: Sep. 26, 1997

Related U.S. Application Data

[60] Provisional application No. 60/027,455, Sep. 27, 1996.
[51] Int. Cl.⁶ .................................................. F02B 27/02
[52] U.S. Cl. ................................................ 60/313; 60/323
[58] Field of Search ....................................... 60/313, 323

[56] References Cited

U.S. PATENT DOCUMENTS 3,470,690  10/1969  Thompson .................................. 60/323
3,507,301   4/1970  Larson ...................................... 60/323
4,116,172   9/1978  Lohr et al. ................................. 60/313
5,072,583  12/1991  Urushihara et al. ....................... 60/313

*Primary Examiner*—Marguerite McMahon
*Attorney, Agent, or Firm*—Charles E. Cates; Richard G. Harrer

[57] ABSTRACT

An improved header assembly for use in V-8 engines. In engines having eight cylinders, performance can be unexpectedly improved by utilizing an improved header assembly whereby the exhaust gas from each of cylinders 4 and 7 is routed by means of a by-pass tube to a specific area in a second stage collector while the exhaust gas from the remainder of the cylinders is routed to a first stage collector. Such an arrangement of tubes routing exhaust gas into first and second stage collectors creates smooth, non-turbulent exhaust gas flow through the collector resulting in greater engine horsepower and torque.

5 Claims, 3 Drawing Sheets

HEADER ASSEMBLY FOR INTERNAL COMBUSTION ENGINES

This application claims benefit USC Provisional Appln No. 60/027,455 filed Sep. 27, 1996.

FIELD OF THE INVENTION

The present invention relates to an exhaust system for internal combustion engines, and more particularly, to a header assembly for use in V-type engines having 8 cylinders.

BACKGROUND

A wide variety of header systems have been developed for exhausting combustion gases from the cylinders of internal combustion engines and directing the gases to an exhaust pipe in order to improve horsepower, vary the maximum torque bend, improve fuel efficiency and the like. Basically, a header assembly includes a flange plate that bolts up to the engine's exhaust ports, primary tubes that extend from holes in the flange plate at the exhaust port locations to a collector tube which collects the exhaust and directs it into the balance of the system which customarily comprises a muffler, catalytic converter and tail pipe.

A wide variety of header designs have been developed. A rather common design is what is called the four-into-one design in which four primary tubes from the flange proceed to a collector or transition pipe where the total cross sectional area of the primary pipes is collected and reduced to the cross section of the exhaust pipe. In other designs, pairs of primary pipes are brought together, then the combined primaries are brought into a collector. In pure racing vehicles, the primary pipes from the flanges may be brought outside the vehicle independently, each functioning as an individual exhaust pipe. In other designs, primary pipes from opposite banks of a V-8 engine may be brought together in a variety of configurations.

It is known that each of the header components has an effect on performance. As an example, using a smaller primary tube diameter tends to lower the torque peak, which is advantageous in a street vehicle, but not in a racing-type vehicle. Also, longer primary tubes increase low end torque, as will a larger collector. Equal length primary tubes assure that each cylinder is scavenged equally. Uniform flow in and avoidance of turbulence in the primary pipe, collector and exhaust system is important in reducing back pressure and maximizing both power and fuel efficiency.

A basic problem is at the point where the primary tubes come together and enter the collector. This has been indicated to be a problem area in assuring smooth, non-turbulent exhaust gas flow through the collector. The cross-sectional area that is formed between the bundled primary pipe ends, approximately square with four primary pipes and approximately triangular with three primary pipes seems to be a cause of turbulence. Attempts have been made to smooth this transition by cutting back the adjacent surfaces of adjacent primary pipes and then welding them together to substantially eliminate the area between the pipe ends. This is difficult, expensive in design and manufacture, and with a number of complex welds, may actually add to turbulence.

In U.S. Pat. No. 5,072,583, there is disclosed an exhaust system for a 4-cylinder inline engine that allows for by-passing the collector. The exhaust system includes a dual exhaust pipe section defining the first and second exhaust passages. The two exhaust passages join at a single confluent point. A muffler is employed to absorb and damp out exhaust noises. An ejector is provided upstream of and adjacent to the collector such that its cross-sectional area is gradually expanded towards its downstream direction. The system also has an additional communication passage communicating with both of the exhaust passages and the collector. This communication passage parallels the exhaust passages in such a manner that it by-passes the collector.

In another system familiar to applicant, and one that is designed specifically for V-8 engines with crankshafts of the 2-plane, 4-throw type with throws phased at 90 degrees, it is stated that the system alleviates the "crowded" condition at the collector by means of a by-pass communication passage. The system provides that three of the four cylinders in each bank of cylinders in the V-8 engine which ignite most equally communicate from the engine exhaust port to a collector using a plurality of exhaust branches. The remaining cylinder that is out of the semi-equal firing order of the other three, that is, the cylinder that ignites 90 degrees after one of the previous cylinders, communicates with the pulse converter via a by-pass tube at a by-pass point. Thus, in an engine whereby cylinders 1, 3, 5 and 7 are in one bank, and cylinders 2, 4, 6 and 8 are in the opposite bank, cylinders 7 and 8 (the end cylinders) are said to be out of a semi-equal firing order, that is, cylinders 7 and 8 ignite 90 degrees after one of the previous 3 cylinders on each bank. Thus, exhaust gas from cylinders 7 and 8 is sent to a collector by means of by-pass tubes. These by-pass tubes enter the collector somewhat downstream of the ejector. This is said to result in the introduction of exhaust gas from cylinders 7 and 8 into a low pressure region at a by-pass point, and is said to balance the volumetric efficiency of the cylinders (7 and 8) which are out of the semi-equal filing order.

SUMMARY OF THE INVENTION

It has been discovered that the performance of a V-8 engine having a firing order of 1, 8, 4, 3, 6, 5, 7, 2 can be unexpectedly improved by utilizing an improved header assembly whereby the exhaust gas from each of cylinders 4 and 7 is routed by means of a by-pass tube to a specific area in a second stage collector. In such an assembly, the exhaust gas from the three remaining cylinders in each bank of cylinders is routed to a first stage collector by means of three primary exhaust pipes. Thus, exhaust gas from cylinder 4 on the right bank of the engine, and cylinder 7 on the left bank of the engine, are routed to a second stage collector by means of a by-pass exhaust pipe. The point at which the exhaust gas from cylinder 4 on the right bank of cylinders and cylinder 7 on the left bank of cylinders means the exhaust gases emanating from the first stage collector is critical. In a most preferred embodiment, the by-pass pipe from cylinder 4, for example, enters the sidewall of the second stage collector through an opening in a sidewall thereof. The end of the first stage collector pipe from cylinders 2, 6 and 8 is so positioned in the interior of the second stage collector that the end of the pipe is lined up with the center of the opening in the sidewall for the by-pass pipe from cylinder 4. The same is true for cylinder 7. That is, the end of the first stage collector pipe from cylinders 1, 3 and 5 is so positioned in the interior of a second stage collector that the end of that pipe is lined up with the center of the opening in the sidewall for the by-pass pipe from cylinder 7.

DESCRIPTION OF A PREFERRED EMBODIMENT

Figure 1:
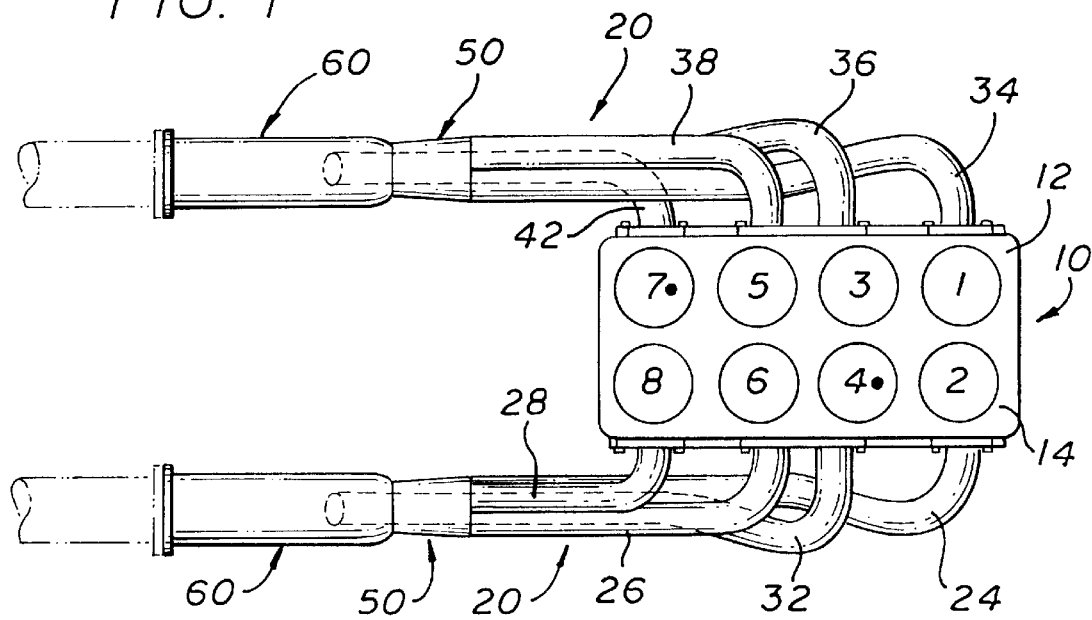
FIG. 1 is a schematic plan view of a V-8 engine with a header assembly of this invention.

A preferred embodiment of this invention is illustrated in the various figures as it applies to a V-type engine of 8 cylinders, and having a firing order of 1, 8, 4, 3, 6, 5, 7 and 2. As shown in FIG. 1, engine 10 is a V-8 engine having a left bank 12 of 4 cylinders numbered 1, 3, 5 and 7, and a right bank 14 of 4 cylinders numbered 2, 4, 6 and 8. Cylinders 1 and 2 of engine 10 are at the front of the vehicle in which the engine is mounted.

Figure 2:
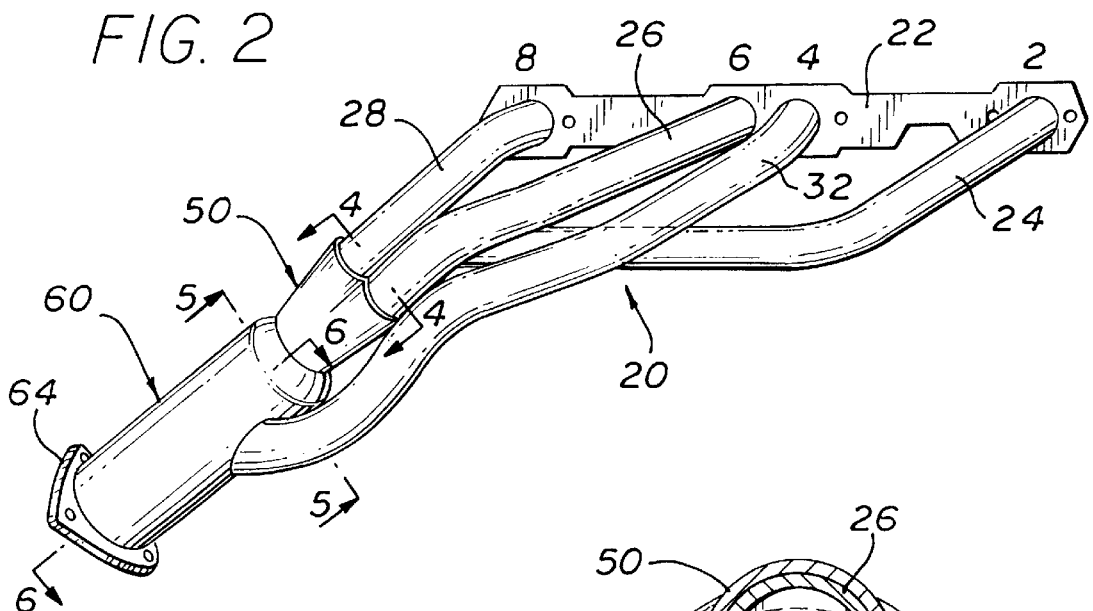
FIG. 2 is a perspective view of a header assembly for exhausting gases from cylinders 2, 4, 6 and 8.
Figure 3:
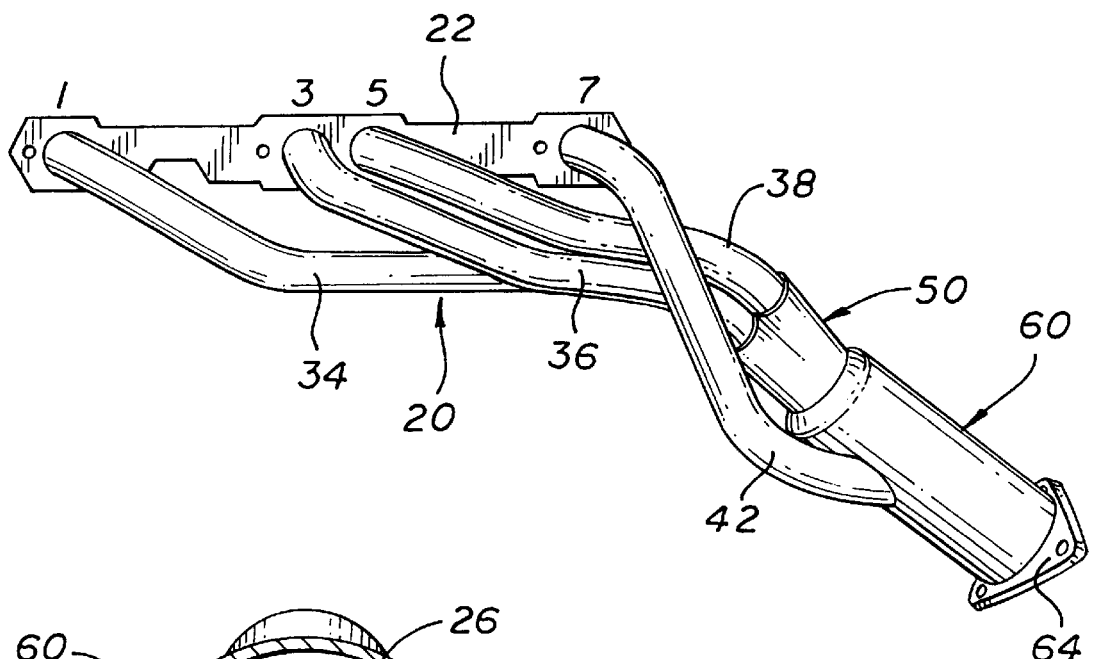
FIG. 3 is a perspective view of a header assembly for exhausting gases from cylinders 1, 3, 5 and 7.
Figure 5:
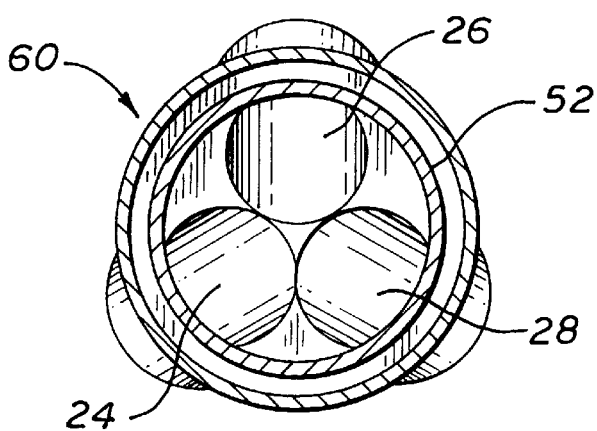
FIG. 5 is a sectional view taken on line 5—5 of FIG. 2.
Figure 8:
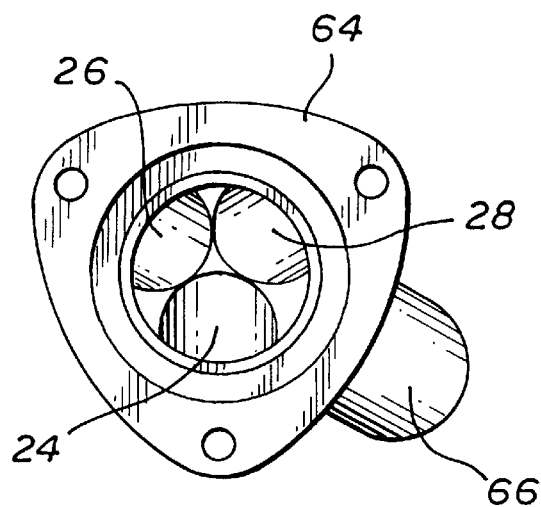
FIG. 8 is a view of a mounting flange that connects the header assembly to the balance of an exhaust system.

A separate header assembly 20 is provided for each of banks 12 and 14 of engine 10. As shown in FIGS. 1, 2 and 3, header assembly 20 for the left bank 12 includes flange 22, primary exhaust pipes 34, 36 and 38, by-pass exhaust pipe 42, first stage collector 50, and second stage collector 60. Header assembly 20 for the right bank 14 includes flange 22, primary exhaust pipes 24, 26 and 28, by-pass exhaust pipe 32, first stage collector 50, and second stage collector 60. It should be apparent that each of the primary exhaust pipes and the by-pass exhaust pipes communicate with the exhaust port in the cylinder head of each cylinder. Thus, on the left bank, primary exhaust pipes 24, 26 and 28 communicate with the exhaust ports of cylinders 2, 6 and 8, respectively. By-pass exhaust pipe 32 communicates with the exhaust port of cylinder 4. Similarly, on the right bank, primary exhaust pipes 34, 36 and 38 communicate with the exhaust ports of cylinders 1, 3 and 5, respectively. By-pass exhaust pipe 42 communicates with the exhaust port of cylinder 7.

Figure 4:
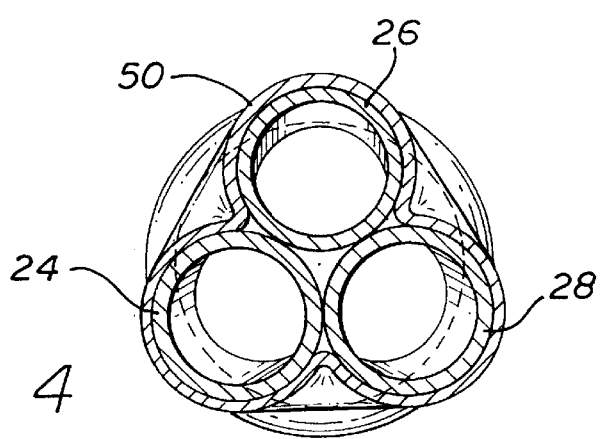
FIG. 4 is a sectional view taken on line 4—4 of FIG. 2.

The three primary pipes coming off the right bank of engine 10 converge together into collector 50. As shown best in FIG. 4, collector 50 surrounds the three pipes 24, 26 and 28 so that the pipes converge in a generally triangular pattern. Similarly, the primary pipes which come off of the left bank of the engine also converge at a collector 50. As shown best in FIGS. 6 and 7, second stage collector 60 is a cylindrical structure which is provided with opening 58 at one end and flange 64 at its opposite end. Fitted into opening 58 and extending into the interior of the second stage collector 60 is a cylindrical-shaped extension 52 of first stage collector 50. In the preferred embodiment as shown, the diameter of extension 52 is reduced somewhat to form extension 54 which is positioned within the interior of secondary collector 60.

Figure 6:
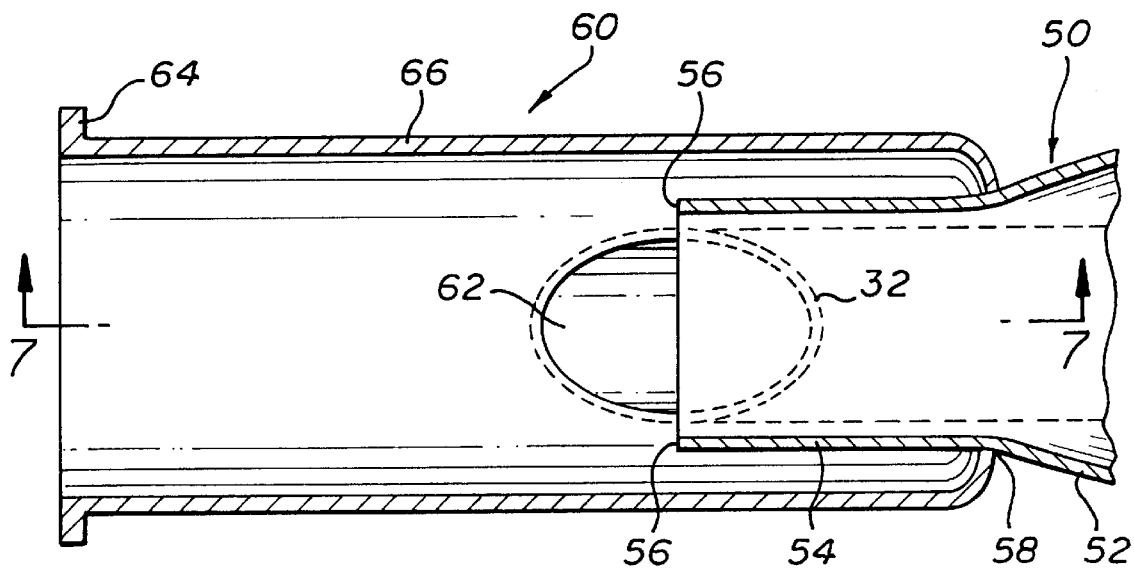
FIG. 6 is a sectional view taken on line 6—6 of FIG. 2.
Figure 7:
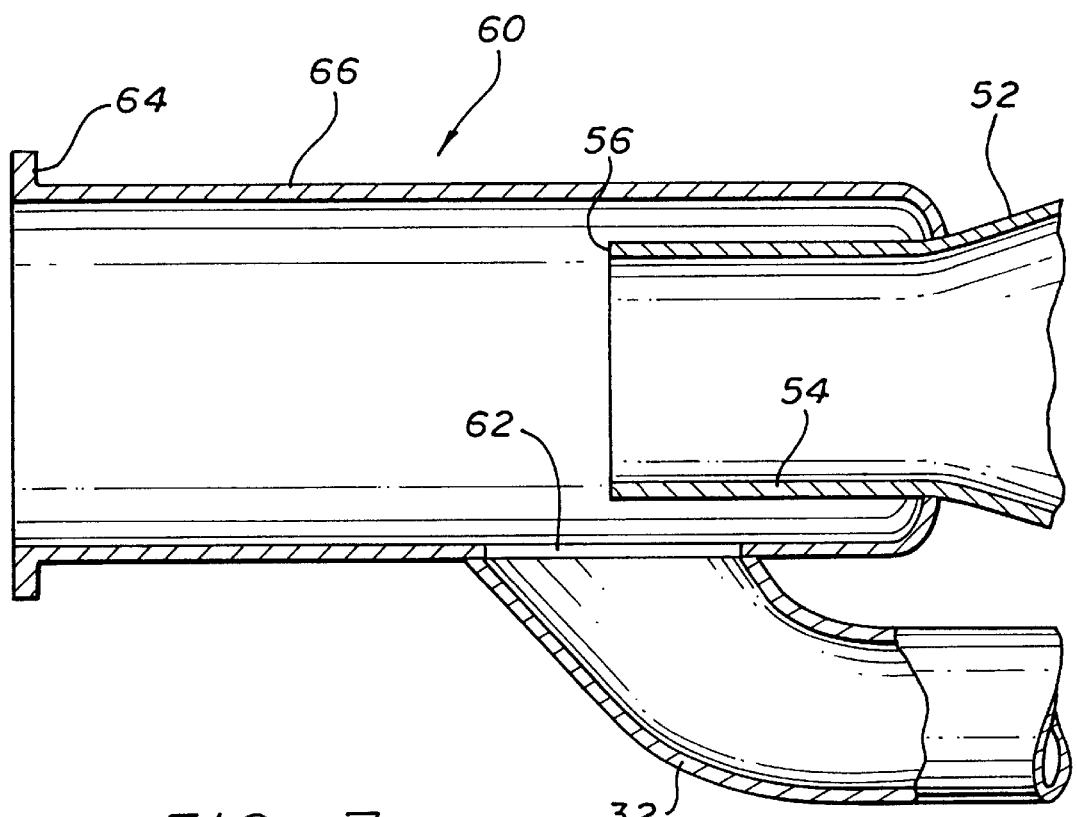
FIG. 7 is a sectional view taken on line 7—7 of FIG. 6.

Each of the by-pass exhaust pipes 32 and 42 lead into secondary collector 60. As shown in FIGS. 6 and 7, wall 66 of collector 60 is provided with opening 62, and by-pass pipe 32 is connected to opening 62. Thus, exhaust gas from cylinder 7 is able to enter into the interior of collector 60. The position of opening 62 in wall 66 with respect to the end 56 of first stage collector pipe 54 is very important. As shown, the end 56 of first stage collector pipe 54 is so positioned in the interior of secondary stage collector 60 that it is in line with the center of opening 62 of sidewall 66. Of course, the same is true for by-pass pipe 42 which communicates from cylinder 7 and leads into its own second stage collector. Our experiments indicate that the end 56 of collector pipe 54 should vary no more than 10 percent off of the center line of opening 62. That is, if the end of the collector is off the center of opening 62 by more than 10 percent of the diameter of opening 62, more turbulence will result which impedes the flow of exhaust gas through the by-pass pipe and reduce the performance of the engine.

A test was run on a dynamometer to compare the horsepower and torque ratings of a V-8 engine of the type described herein. In Test #I, cylinders 4 and 7 were by-passed in accordance with the teachings herein, and the end 56 of collector pipe 54 was lined up with the center of opening 62 in the sidewall 66 of the second stage collector. In Test #II, the same V-8 engine was used, but cylinders 7 and 8 were by-passed. The by-pass pipe was positioned in the second stage collector ad described in Test #I.

Results were as follows:

| Test No. | RPM | Horsepower | Torque |
|----------|------|------------|--------|
| I        | 2400 | 320        | 146    |
| II       | 2400 | 318        | 139    |

It was also noted that the engine in Test I ran somewhat cooler and with less turbulence than in Test II.

I claim:

1. An exhaust system for an internal combustion engine of V-8 configuration wherein one bank of cylinders of said engine includes cylinders numbered in order 1, 3, 5 and 7 and the other bank of cylinders include cylinders numbered in order 2, 4, 6 and 8, with cylinders 1 and 2 being at the front end of said engine, said exhaust system comprising:

a. a header assembly for each bank of cylinders, each such assembly comprising three primary exhaust pipes and one by-pass exhaust pipe, with the by-pass exhaust pipe from one bank of cylinders coming from cylinder No. 4 and the other by-pass pipe from the other bank of cylinders coming from cylinder No. 7;

b. a first stage collector for each of said cylinder banks with the three primary exhaust pipes from each of said engine banks converging into said first stage collector;

c. a second stage collector for each of said engine banks with an extension of said first stage collector positioned a distance within the interior of said second stage collector; with the wall of said extension of said second stage collector provided with an opening sized to receive the end of said by-pass exhaust pipe;

d. said opening in the wall of said extension of said second stage collector being so positioned that the center of said opening is substantially in line with the end of said extension of said first stage collector.

2. The exhaust system of claim 1 wherein the firing order of said engine is 1, 8, 4, 3, 6, 5, 7, 2.

3. The exhaust system of claim 2 wherein the end of said extension of said first stage collector will vary no more than ten percent off of the center line of said opening in the wall of said extension of said first stage collector.

4. The exhaust system of claim 3 wherein said extension of said first stage collector into said second stage collector is of a reduced diameter from that of the main section of said first stage collector.

5. The exhaust system of claim 4 wherein said three primary exhaust pipes converge into said first stage collector in a generally triangular configuration.

* * * * *